(12) United States Patent
Lopez (10) Patent No.: US 10,147,056 B1
(45) Date of Patent: Dec. 4, 2018

(54) IMPLICIT OCCASION PERSONALIZATION FOR RESTAURANTS

(71) Applicant: Amazon Technologies, Inc., Seattle, WA (US)

(72) Inventor: Gustavo Eduardo Lopez, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 548 days.

(21) Appl. No.: 14/738,460

(22) Filed: Jun. 12, 2015

(51) Int. Cl.
*G06Q 10/02* (2012.01)
*G06Q 30/06* (2012.01)
*G06Q 50/12* (2012.01)

(52) U.S. Cl.
CPC ......... *G06Q 10/02* (2013.01); *G06Q 30/0631* (2013.01); *G06Q 50/12* (2013.01)

(58) Field of Classification Search
None
See application file for complete search history.

(56) References Cited

U.S. PATENT DOCUMENTS

| | | | | |
|---|---|---|---|---|
| 2009/0216607 A1* | 8/2009 | Bartholomew | ........ | G06Q 30/02 705/14.49 |
| 2013/0325641 A1* | 12/2013 | Brown | ............... | G06Q 30/0631 705/15 |
| 2015/0371238 A1* | 12/2015 | Wang | ..................... | G06Q 40/12 705/30 |

FOREIGN PATENT DOCUMENTS

WO WO2011005072 A2 * 6/2010

* cited by examiner

*Primary Examiner* — Florian M Zeender
*Assistant Examiner* — Denisse Y Ortiz Roman
(74) *Attorney, Agent, or Firm* — Lee & Hayes, PLLC (57) ABSTRACT

Implicit occasion personalization is described. A service provider may access user data associated with users corresponding to the user devices. The user data may represent user interactions with a plurality of entities that each offer one or more services. The service provider may determine a user pattern associated with a user of the plurality of users and may determine, from the user pattern, that the user is likely to request and/or receive the one or more services on a date. The service provider may generate a recommendation including at least one of a deal associated with the one or more services or a reservation on the date to the individual user on or before the date.

20 Claims, 6 Drawing Sheets

ASSIGN SCORE TO INDIVIDUAL USERS INDICATING A LIKELIHOOD THAT A USER WILL INTERACT WITH AN ENTITY WITHIN A PREDETERMINED TIME FRAME
402

↓

RANK INDIVIDUAL USERS BASED ON SCORE
404

↓

SEND RECOMMENDATIONS TO AT LEAST SOME OF THE RANKED INDIVIDUAL USERS
406

IMPLICIT OCCASION PERSONALIZATION FOR RESTAURANTS

BACKGROUND

The restaurant industry has traditionally been an industry that is reliant on personal interactions. A large proportion of the restaurant industry is driven by factors that are dependent on humans and accordingly, are difficult to predict. For instance, unlike other industries such as the airline industry or theater industry where all seats are reserved for a same starting time, tables at a restaurant become available at various times depending on a variety of factors such as an amount of time that patrons occupy the tables, the food and/or beverages that the patrons order, a number of tables in a server's section, etc. Accordingly, the restaurant industry has been reluctant to adapt online technology. As such, the restaurant industry poses new challenges in the world of e-commerce and online technology.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Techniques for implicit occasion personalization are described herein. In at least one example, the techniques described herein include accessing user data associated with users corresponding to individual user devices. The user data may represent user interaction with and/or user behavior exhibited at a plurality of entities that are associated with one or more goods and/or one or more services. The techniques described herein further include determining, from the user data, user patterns associated with users and comparing the user patterns to event data to determine whether dates associated with the user patterns correspond to one or more predetermined dates associated with the event data. Based at least in part on comparing the user data to the event data, the techniques described herein may infer occasions and may generate and cause one or more recommendations to be presented to the user via a user interface associated with the user device. The one or more recommendations may be personalized in frequency and content based on the user patterns.

The techniques described herein include identifying user patterns between users and various entities and leveraging the user patterns to personalize recommendations to the users. For the purpose of this discussion, entities may include individuals or merchants, such as restaurants, spas, retail stores, fitness facilities, etc., as described below. The entities each may offer one or more goods and/or one or more services. The services may include food and/or beverage services, spa services, personal styling services, fitness services, etc.

The techniques described herein leverage user data to determine user patterns associated with individual users. For the purpose of this discussion, user patterns are indicative of individual user behaviors. In at least one example, a user pattern may indicate that a user engaged in a behavior at a frequency above a predetermined threshold and/or a predetermined number of times (possibly during a predetermined time period), and as a result, is likely to behave in a same manner in the future. That is, the user patterns represent propensities of users to engage in a behavior with respect to various entities and/or services based at least in part on past behaviors of the users.

The techniques described herein may compare the user patterns with event data including one or more predetermined dates to determine whether the user patterns correspond to any of the one or more predetermined dates. In some examples, the techniques described herein may infer an occasion based on user patterns that do not correspond to any of the one or more predetermined dates. Accordingly, the techniques described herein may leverage the user patterns and resulting inferences to personalize the frequency and content of recommendations to users associated with the user patterns. The techniques described herein may enable restaurants, spas, retail stores, fitness facilities, etc., to interact with users in a targeted, personal manner.

As described above, the techniques described herein may learn user patterns and may personalize recommendations to the user based on the user patterns. In a non-limiting example, the service provider may learn that a user regularly orders take-out for lunch on Fridays. The service provider may learn that the user typically orders pho. Additionally, the service provider may learn that the user is not consistent with the restaurants he or she orders pho for lunch on Fridays; that is, the user likes to try new restaurants each Friday. The service provider may leverage the user patterns to personalize recommendations for the user. In at least one example, the service provider may recommend pho orders at one or more restaurants for the user to order take-out for lunch on a Friday. In other examples, the service provider may offer a deal for a new pho restaurant to the user on or before lunch on a Friday. The service provider may make the recommendations based on user data and/or similarities between the new restaurant and other restaurants that the user patronizes.

In a non-limiting example, the service provider may learn that a user dines out on July $4^{th}$ each year at Restaurant B. By comparing the user pattern with event data, the service provider may determine that the user is likely to dine out at Restaurant B on July $4^{th}$. The service provider may leverage the user patterns to personalize recommendations for the user. That is, the service provider may recommend a reservation at Restaurant B on or before July 4th. As such, the service provider may leverage the user patterns to personalize each interaction that the service provider has with the user.

Additionally and/or alternatively, the techniques described herein may learn user patterns and may identify atypical interactions with entities. For the purposes of this discussion, an atypical interaction is a user interaction that is different from a user's known and/or determined user patterns. Atypical interactions may include making a reservation when a user doesn't usually make reservations, ordering dessert when a user doesn't usually order dessert, patronizing a restaurant with a dress code when a user typically patronizes less formal restaurants (e.g., a pub, a fast food restaurant, etc.), spending an amount that is greater than a user's average weekly spending, etc. An atypical interaction may occur at a frequency above a predetermined threshold and/or a predetermined number of times (possibly during a predetermined time period) such that the service provider may determine that the atypical interaction is a new pattern. The new pattern may be leveraged to imply occasions and personalize recommendations based on the new pattern and/or occasions.

In a non-limiting example, a service provider may learn that a user regularly patronizes restaurants and does not make reservations. The service provider may learn that the user usually dines at Restaurant A, a less-formal restaurant. However, the service provider may learn that on a date each year (e.g., March $5^{th}$) the last three years, the user makes a reservation at a high-end restaurant. The service provider may determine that the reservation at the high-end restaurant on March $5^{th}$ is a new pattern.

In at least one example, the service provider may compare the date to event data including one or more predetermined dates such as dates of holidays, events, etc. to determine whether the date corresponds to any of the one or more predetermined dates. If the date does not correspond to any of the one or more predetermined dates, the service provider may infer that the date is associated with an occasion that is personal to the user. Perhaps the date (e.g., March $5^{th}$) is the birthday, anniversary, or other occasion that is personal to the user, the user's family and/or the user's friends. The service provider may leverage the user pattern to make recommendations to the user. In at least one example, the service provider may recommend a reservation at the high-end restaurant to the user on or before the date (e.g., March $5^{th}$). Or, perhaps the service provider described herein may want to encourage the user to dine at the high-end restaurant more frequently than one time per year. Accordingly, the service provider may recommend a deal to the high-end restaurant for some date other than the date. As such, the service provider may leverage the user patterns to personalize each interaction that the service provider has with the user.

Figure 1:
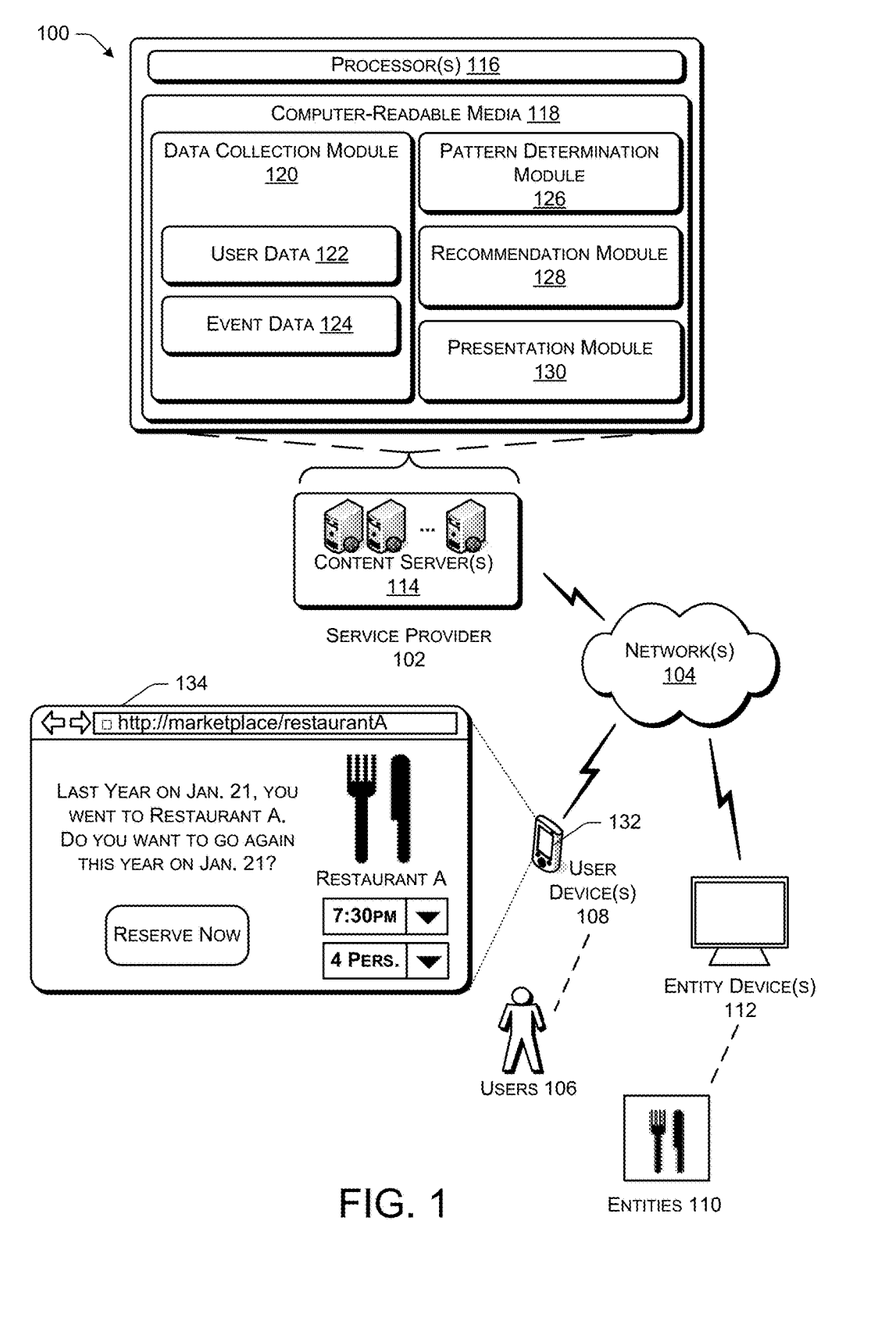
FIG. 1 is a diagram showing an example system for identifying user patterns and leveraging the user patterns to personalize recommendations to users.

FIG. 1 is a diagram showing an example system 100 for identifying user patterns and leveraging the user patterns to personalize recommendations to users. More particularly, the system 100 may include a service provider 102, one or more network(s) 104, one or more users 106, one or more user devices 108 associated with the one or more users 106, one or more entities 110, and one or more entity devices 112 associated with the one or more entities 110.

The service provider 102 may be any entity, server(s), platform, etc., that enables the user devices 108 to communicate with the entity devices 112. In various examples, the service provider 102 may access user data to learn patterns from the user data and/or access event data for determining correlations between the user patterns and event data and/or implying occasions. Based on the determined correlations, the service provider 102 may make personalized recommendations to the users 106, via the user devices 108. The recommendations may include reservations, deals, invitations to events, etc.

The service provider 102 may be implemented in a non-distributed computing environment or may be implemented in a distributed computing environment, possibly by running some modules/applications on user devices 108, entity devices 112, or other remotely located devices. As shown, the service provider 102 may include one or more content server(s) 114, which may include one or more processor(s) 116 and computer-readable media 118. The content server(s) 114 may also include additional components not listed above that may perform any function associated with the content server(s) 114. In various embodiments, each of the content server(s) 114 may be any type of server, such as a network-accessible server.

In some examples, the network(s) 104 may be any type of network known in the art, such as the Internet. Moreover, the service provider 102, user devices 108, and/or entity devices 112 may communicatively couple to the network(s) 104 in any manner, such as by a wired or wireless connection. The network(s) 104 may facilitate communication between the content server(s) 114, the user devices 108 associated with the users 106, and/or the entity devices 112 associated with the entities 110.

In at least one example, the user 106 may interact with the service provider 102 via a corresponding user device 108. The user device 108 may include a display for presenting a site (i.e., a website), a self-service portal, a self-service interface, etc. to the users 106, one or more mechanisms configured to receive user input (e.g., voice input, biometric input, etc.), etc. The user device 108 may include software, applications, etc., that are associated with the service provider 102. As a result, the service provider 102 may obtain or access information from (e.g., user data, etc.), and/or provide information to, the user 106. In at least one example, the users 106 may include consumers interacting with the service provider 102 to request goods and/or services at, or associated with, an entity 110. For instance, a user 106 may make a reservation and/or place an order for food and/or drinks at a restaurant, the user 106 may schedule a manicure at a nail salon, schedule a personal styling appointment at a brick-and-mortar retail store, reserve exercise machine/equipment at a fitness facility, etc. In at least one example, an agent (e.g., virtual assistant, co-worker, friend, etc.) may request the goods and/or services on behalf of the user 106.

In various examples, the users 106 may request goods and/or services by actuating a control on a user interface presented on a display 132 of a user device 108. The control may be associated with an application associated with the service provider 102 or a hyperlink that directs the user 106 to a new user interface and prompts the user 106 to input additional information for making the request for the goods and/or services. In other examples, the users 106 may request goods and/or services by interacting with the user device 108 via one or more user inputs, including but not limited to voice inputs, biometric inputs, etc. Based at least in part on requesting goods and/or services over the computer network, the user 106 may arrive at the physical location (e.g., restaurant, salon or spa, etc.) and have access to or receive the goods and/or services offered by a corresponding entity 110. In some examples, a user 106 may pay for goods and/or services using his or her user device 108. That is, based at least in part on requesting goods and/or services at the physical location, the user 106 may pay for his or her requested goods and/or services at the physical location (e.g., restaurant, salon or spa, etc.) via a computer network (e.g., service provider 102) using his or her user device 108.

In various examples, the entities 110 may be any individual or merchant that provides goods and/or services (e.g., food and/or beverage service, spa service, personal styling service, fitness service, etc.) at a physical location. Additionally, the entities 110 may offer their goods and/or services at a merchant-branded merchant site (e.g., website), an intermediary marketplace, etc. In at least one example, the entities 110 may interact with the service provider 102 via an entity device 112. The entity device 112 may include a display for presenting a site (i.e., a website), a self-service portal, a self-service interface, etc. to the entities 110, one or more mechanisms configured to receive input (e.g., voice input, biometric input, etc.), etc. In various examples, the entity devices 112 may be a device associated with the service provider 102 that is in the possession of an entity 110. That is, the entity devices 112 may be provided to the entity 110 by the service provider 102. In other embodiments, the entity devices 112 may include software, applications, etc., that are associated with the service provider 102. As a result, the service provider 102 may obtain or access information from, and/or provide information to, the entity 110.

In some examples, the entity devices 112 may be point of sale (POS) devices, communicatively coupled to the service provider 102. POS systems may include computerized networks that are operated by main computers and are linked to several checkout terminals. A POS device may be one of the main computers or checkout terminals in the POS system. POS systems are often used by merchants (e.g., entities 110) for completing transactions. In the restaurant industry, POS systems may include software for creating and printing guest checks, printing orders to kitchens and bars for preparation, processing credit cards and other forms of payment, running reports, etc. In addition, some POS systems include software to enable restaurant employees to manage waiting lists and reservations. In other service industries (e.g., salons, spas, mechanics, etc.), POS systems may include software for creating and printing guest checks, processing credit cards and other forms of payment, running reports, etc. In addition, some POS systems include software to enable service employees to manage walk-ins and appointments.

In some examples, the users 106 may operate corresponding user devices 108 to perform various functions associated with the user devices 108, which may include at least some of the operations and/or modules discussed above with respect to the service provider 102. Additionally, in some examples, the entities 110 may operate corresponding entity devices 112 to perform various functions associated with the entity devices 112, which may include at least some of the operations and/or modules discussed above with respect to the service provider 102.

As shown, the service provider 102 may include one or more content server(s) 114, which may include one or more processor(s) 116 and computer-readable media 118. In various examples, the processor(s) 116 may execute one or more modules and/or processes to cause the content server(s) 114 to perform a variety of functions, as set forth above and explained in further detail in the following disclosure. In some embodiments, the processor(s) 116 may include a central processing unit (CPU), a graphics processing unit (GPU), both CPU and GPU, or other processing units or components known in the art. Additionally, each of the processor(s) 116 may possess its own local memory, which also may store program modules, program data, and/or one or more operating systems.

In at least one configuration, the computer-readable media 118 of the content server(s) 114 may include any components that may be used to facilitate interaction between the service provider 102, the users 106, and/or the entities 110. The components may represent pieces of code executing on a computing device. The computer-readable media 118 may include a data collection module 120, storing user data 122 and event data 124, a pattern determination module 126, a recommendation module 128, a presentation module 130, etc. Depending on the exact configuration and type of the content server(s) 114, the computer-readable media 118 may also include volatile memory (such as RAM), non-volatile memory (such as ROM, flash memory, miniature hard drive, memory card, or the like), or some combination thereof.

The data collection module 120 may receive data associated with users 106 from the users 106 and/or the entities 110, and/or access and/or infer data associated with users 106 via third party sources and systems (e.g., social networks, professional networks, partner webstore purchases, etc.). The user data 122 may include a database of users 106 and data corresponding to each of the individual users 106. In some examples, the data collection module 120 may receive, access, and/or infer event data 124. The data collection module 120 stores at least some of the user data 122 and/or event data 124 and the pattern determination module 126 may leverage the user data 122 and/or event data 124 for learning (e.g., via machine learning) user patterns. As described above, a user pattern may indicate that a user 106 engaged in a behavior at a frequency above a predetermined threshold and/or a predetermined number of times (possibly during a predetermined time period). In non-limiting examples, a user 106 may reserve an elliptical at a fitness facility 25 days each month, a user 106 may have his or her nails done on a same day of five months in a six month time frame, a user 106 may dine-out on January 2 four years in a five year time period, etc. Additionally or alternatively, a user 106 may reserve an elliptical at a fitness facility every day for ten days, a user 106 may have his or her nails done on a same day each month for six months, a user 106 may dine-out on January 2 each year for five years, etc. In some examples, user patterns may be mapped to dates and/or events, as described below.

The data collection module 120 may receive, access, and/or infer user data 122. In some examples, users 106 may input user data 122 when they set up a user account or profile for interacting with the service provider 102. The user 106 may provide demographic information (gender, age, profession, food allergies, etc.), calendar information (birthdays, holidays, anniversaries, etc.), etc. that is associated with the user 106 and/or associated with friends and/or family of the user 106 to the data collection module 120. Users 106 may also provide preferences associated with goods and/or services. In one example, a user 106 may provide dining preferences. Dining preferences may include preferences associated with whether the users 106 prefer dine-in, take-out, or delivery options. Dining preferences may include preferences associated with restaurants that users 106 prefer to patronize, features users 106 prefer for the tables they occupy, servers users 106 prefer to serve them, other users 106 they prefer to dine with, food and/or beverages users 106 prefer to order, etc. Users 106 may also provide preferences for other types of services (e.g., spas, fitness facilities, etc.).

In some examples, the data collection module 120 may receive, access, and/or infer user data 122 based on the service provider 102 receiving user information and actions associated with a user account (e.g., purchases (e.g., orders), reservation requests, sales, browsing histories, search histories, recommendations, location proximity, etc.). In at least one example, the data collection module 120 may receive information based on a user 106 redeeming a previously acquired deal associated with an entity 110 via the service provider 102. For the purpose of this discussion, deals may represent some form of value to be applied when items that are acquired by users 106 in association with the deals, such as a discount, a coupon, a credit, a rebate, and the like. The deals may also represent an offer and/or promotion to acquire one or more items associated with the deals or may represent one or more advertisements associated with the deals. The deals may also be offered at any price point, including being offered at no cost, such as the users 106 being offered a deal that includes an item at no additional cost to the user 106. The items offered in association with the deals may include tangible items, intangible items, products, goods, services, a bundle of items, digital goods, digital services, events, and the like. In additional or alternative examples, the data collection module 120 may receive information based on a user 106 making a reservation or requesting access to goods and/or services through the service provider 102. In some examples, the data collection module 120 may receive information based on a user 106 making a payment to an entity 110 via a user device 108. In other examples, the data collection module 120 may receive information based on entities 110 inputting information about the user 106 into entity devices 112 such as POS devices. In each of the above examples, the data collection module 120 may receive information about entities 110 that the user 106 patronized, a time, day, and/or date the user 106 patronized the entities 110, goods and/or services requested and/or received by the user 106, how much the user 106 spent, how many other users 106 the user 106 patronized the entity with, a rating of the entity 110, etc.

In other examples, the data collection module 120 may receive, access, and/or infer user data 122 from third party sources and systems (e.g., social networks, professional networks, partner webstore purchases, etc.). In at least one example, the data collection module 120 may receive, access, and/or infer information from the third party sources and systems to determine users 106 who request and/or receive goods and/or services together, how many users 106 are in a party, how the different users 106 paid for the goods and/or services, etc. In at least one example, the data collection module 120 may access and/or determine social graphs associated with users 106 based on accessing user data 122 from third party sources and systems. In some examples, the data collection module 120 may utilize the social graphs to determine relationships between a user 106 and other users 106 that he or she requests goods and/or services with. In additional or alternative examples, the data collection module 120 may access users' 106 social media updates, check-ins, photos, etc. As a result, the data collection module 120 may receive information about entities 110 that the users 106 patronized, a time and/or date the user 106 patronized the entity 110, goods and/or services requested and/or received by users 106, other users 106 that users 106 requested and/or received the goods and/or the services with, etc.

In some examples, the data collection module 120 may be granted access to e-mail accounts associated with users 106. The data collection module 120 may mine e-mail messages and content to access information about the users 106. The data collection module 120 may leverage the information from e-mail messages and content to determine whether users 106 are planning a trip, expecting guests, etc. In additional or alternative examples, the data collection module 120 may receive global position system (GPS) logs from user devices 108 associated with GPS devices. The data collection module 120 may leverage the GPS logs to determine where users 106 patronize entities 110, whether users 106 have user patterns associated with travel patterns, etc. In at least one example, the data collection module 120 may utilize the GPS logs, social graphs, and other user data 122 as described above to determine user patterns associated with travelling to other users 106 and/or hosting out of town users 106, etc.

The data collection module 120 may also receive, access, and/or infer event data 124. Event data 124 may include one or more predetermined dates that are associated with events, such as holidays, events, occasions, etc. Holidays may include national holidays, regional holidays, cultural holidays, religious holidays, etc. National holidays represent holidays that are recognized by a national government (e.g., Independence Day, Christmas Day, Bastille Day, etc.). Regional holidays represent holidays that are recognized in a region (e.g., Texas Independence Day, etc.). Cultural holidays represent holidays that are recognized by a culture (e.g., Chinese New Year, Carnival, etc.). Religious holidays are holidays recognized by a particular religion (e.g., Ramadan, Yom Kippur, etc.). Events may include performances, sporting events, festivals, concerts, etc. In some examples, the event data 124 may include dates that are associated with days and/or times that users 106 are likely to associate with holidays and/or days that users 106 generally are known to dine out. For example, the Friday after Thanksgiving, while not a national holiday, regional holiday, cultural holiday, or religious holiday, may be a date included in the event data 124 as a day that users 106 are generally known to dine out. The event data 124 may be manually input by the service provider 102, accessed via websites, and/or provided by other third party sources and systems, etc.

In some examples, the data collection module 120 may receive and/or access event data 124 that includes dates that correspond to occasions that are personal to the users 106. For instance, in some examples, the data collection module 120 may access event data 124 that includes dates that correspond to occasions that are personal to the users 106 by accessing profiles associated with the users 106 and/or third party sources and systems (e.g., social networks, professional networks, partner webstore purchases, etc.) associated with the users 106. Accordingly, the data collection module 120 may access dates such as anniversaries, birthdays, other occasions, etc. that are associated with the user 106, friends of the user 106, family of the user 106, etc. In other examples, the data collection module 120 may not have access to the event data 124 that includes dates that are occasions that are personal to the users 106. In such examples, the pattern determination module 120 may learn user patterns from the user data 122 and leverage the user patterns to imply dates that correspond to occasions that are personal to the users 106, as described below.

The pattern determination module 126 utilizes the user data 122 to learn patterns associated with the users 106. User patterns may be used to infer or predict how a user 106 is likely to interact with one or more entities 110 at a time in the future based on past user behaviors that occurred at a frequency above a predetermined threshold and/or a predetermined number of times (possibly during a predetermined time period), as described above. The pattern determination module 126 may leverage machine learning algorithms, such as supervised machine learning algorithms, unsupervised machine learning algorithms, deep learning algorithms, etc., to learn the user patterns from the user data 122. In some examples, the pattern determination module 126 may determine user patterns with respect to entities 110 users 106 patronize, whether the users 106 patronize a variety of entities 110, when (e.g., time, day, date, etc.) the users 106 patronize entities 110, frequencies that the users 106 patronize entities 110, goods and/or services requested and/or received from entities 110, etc. Additionally or alternatively, the pattern determination module 126 may determine other users 106 that the user 106 requests and/or receives the goods and/or services with, whether users 106 interact with entities 110 while they travel, etc. The pattern determination module 126 may determine user patterns associated with whether a user 106 makes reservations, dines-in, orders delivery, and/or orders take-out. The pattern determination module 126 may determine user patterns associated with user preferences such as table characteristics that users 106 prefer (e.g., tables close to windows, tables that are outside, tall tables, etc.), service preferences (e.g., servers, etc.), menu preferences (e.g., types of food/drinks users 106 order, etc.), etc. In some examples, the user patterns may be validated based on user feedback.

As described above, the data collection module 120 may receive, access, and/or infer user data 122 based on the service provider 102 receiving user information and actions associated with a user account (e.g., purchases (e.g., orders), reservation requests, sales, browsing histories, search histories, recommendations, location proximity, etc.). In a non-limiting example, the data collection module 120 may determine that a user 106 eats at a restaurant every Friday night based on at least one of a user 106 making a reservation at a restaurant every Friday night via the service provider 102, redeeming a deal at a restaurant every Friday night, paying for his or her meal at a restaurant via the service provider 102 every Friday night, etc. Accordingly, the pattern determination module 126 may learn that the user 106 is likely to dine out each Friday night. In some examples, the user 106 who dines at a restaurant every Friday night may dine at a same restaurant every Friday night. In other examples, the user 106 who dines at the restaurant every Friday night may dine at different restaurants each Friday night. The pattern determination module 126 may learn these patterns based on the user 106 patronizing the entities 110 on Friday nights at a frequency above a predetermined threshold and/or a predetermined number of times (possibly during a predetermined time period).

In another non-limiting example, a user 106 may make a reservation at Restaurant A every year on January $21^{st}$. The pattern determination module 126 may learn that on January $21^{st}$ the user 106 is likely to make a reservation at Restaurant A. In yet another non-limiting example, a user 106 may order take-out every Tuesday at noon from Restaurant B. Accordingly, the pattern determination module 126 may learn that every Tuesday at noon, the user 106 is likely to order take-out from Restaurant B. In some examples, the pattern determination module 126 may learn specific components of the user's 106 order (e.g., food item(s), beverages, etc.), such as what the user 106 orders for lunch from Restaurant B every Tuesday at noon. In additional or alternative examples, a user 106 may request and/or receive a service (e.g., a pedicure) every month on the $16^{th}$ day of the month. Accordingly, the pattern determination module 126 may learn that on the $16^{th}$ of each month, the user 106 is likely to request and/or receive the service (e.g., a pedicure). The pattern determination module 126 may map each of the user patterns to the respective dates.

In addition to determining user patterns from the user data 122, the pattern determination module 126 may determine when a user's 106 interaction with an entity is atypical. That is, the pattern determination module 126 may learn how a user 106 generally interacts with entities 110, as described above, and the pattern determination module 126 may determine when a user 106 interacts with an entity 110 in a manner that is different than his or her normal interaction. Said another way, the pattern determination module 126 may determine when a user 106 interacts in a manner that is inconsistent with previously determined user patterns. The pattern determination module 126 may determine that the user 106 interacted with an entity 110 in an atypical manner at a frequency above a predetermined threshold and/or a predetermined number of times (possibly during a predetermined time period), and accordingly, may determine the atypical interaction to be indicative of a user pattern. In a non-limiting example, a user 106 may generally order food for pick-up on Thursday nights. However, on a particular Thursday night, the user 106 may make a reservation at the restaurant. The particular Thursday night may be the last Thursday of the month. The pattern determination module 126 may identify that interaction as an atypical interaction. The user 106 may return to ordering food for pick-up on Thursday nights. Then, on the next Thursday that is the last Thursday of the month, the user 106 may make a reservation at the restaurant again. This pattern may repeat at a frequency above the predetermined threshold and/or a predetermined number of times (possibly during a predetermined time period), and accordingly, the pattern determination module 126 may determine that the user 106 is likely to make a reservation at the restaurant on the last Thursday of the month instead of ordering food for pick-up. The pattern determination module 126 may map the user pattern associated with the user 106 to the date (e.g., the last Thursday of the month).

In another non-limiting example, a user 106 may not regularly patronize restaurants (e.g., dine-in, take-out, or delivery). However, on January $21^{st}$ of each year over the course of a predetermined period of time, the user 106 may make a reservation at Restaurant A. In additional or alternative examples, the user 106 may engage in other atypical interactions, such as ordering a car service, champagne, and/or dessert. The user 106 may engage in the atypical interaction(s) on January $21^{st}$ at a frequency above a predetermined threshold and/or a predetermined number of times (possibly during a predetermined time period). The pattern determination module 126 may determine that the user 106 is likely to make a reservation at the restaurant and/or engage in the other atypical interactions again on January $21^{st}$ of the next year. The pattern determination module 126 may map the user pattern to the date (e.g., January $21^{st}$).

The pattern determination module 126 may access user data 122 and/or user patterns and event data 124 and may compare the user data 122 and/or user patterns to the event data 124 to determine whether any of the user patterns correspond to a date of the one or more predetermined dates associated with the event data 124. In some examples, a user pattern may correspond with a date of the one or more predetermined dates. As a non-limiting example, the pattern recognition module 126 may determine that a user 106, who does not generally make reservations when going out to dinner, makes a reservation at Restaurant B on Nov. 22, 2012, Nov. 28, 2013, and Nov. 27, 2014. The pattern determination module 126 may compare that user pattern with the one or more predetermined dates and may determine that the user 106 tends to make a reservation for dinner at Restaurant B every year on Thanksgiving. Accordingly, the pattern determination module 126 may map the user pattern (e.g., a reservation at Restaurant B) to the date and/or event (e.g., Thanksgiving).

In some examples, the pattern determination module 126 may determine that the user pattern does not correspond to any of the one or more predetermined dates. For instance, in the non-limiting example above, the user 106 who may not order food regularly and/or dine out regularly may make a reservation at Restaurant A on January 21 of each year over a predetermined period of time. The pattern determination module 126 may compare the user pattern with the one or more predetermined dates and may determine that January 21 does not correspond to any of the event dates. Accordingly, the pattern determination module 126 may determine that January 21 is a date that is an occasion that is personal to the user 106. For instance, January 21 may be a date corresponding to an anniversary, birthday, other occasion, etc., of the user 106, the user's friends, the user's family members, etc. The pattern determination module 126 may map the user pattern (e.g., a reservation at Restaurant A) to the date (e.g., January 21).

The recommendation module 128 may leverage the user data 122 and user patterns to make recommendations to the users 106. In at least one example, the recommendation module 128 may access the user data 122 and assign each of the users 106 in the database a score associated with a predetermined time frame. The predetermined time frame may be an hour, day, week, month, etc. The score may represent a likelihood that a user 106 will interact with an entity 110 during the hour, the day, the week, the month, etc. The recommendation module 128 may assign the score based on user patterns that are mapped to dates in the predetermined time frame, as described below. The recommendation module 128 may rank the users 106 based on their scores. The recommendation module 128 may send recommendations to the users 106 with scores above a predetermined threshold, or a predetermined number of top ranked users 106, etc.

In some examples, the recommendation module 128 may generate and send deals associated with entities 110 to the users 106 and/or invitations to events hosted and/or sponsored by entities 110 to the users 106. In other examples, the recommendation module 128 may generate recommendations that include reservations, dine-in, take-out, or delivery options, etc. to the users 106. In some examples, the recommendation module 128 may generate and send recommendations to the users 106 consistent with user patterns. For instance, if the user 106 regularly interacts with an entity 110, the recommendation module 128 may recommend a reservation for the entity 110. If a user 106 interacts with entities 110 at a particular time and/or on a particular day, date, etc. the recommendation module 120 may recommend a reservation for the particular time, day, date, etc. Additionally or alternatively, if a user 106 interacts with different entities 110 each time a user 106 requests and/or receives goods and/or services, the recommendation module 120 may send recommendations for the goods and/or services associated with different entities 110. In at least one example, if a user 106 requests a particular good and/or service, the recommendation module 128 may generate recommendations that include recommendations directed to the particular goods and/or services.

In other examples, the recommendation module 128 may make recommendations to encourage changes in user patterns (e.g., recommendations that are inconsistent with user patterns). For instance, the recommendation module 128 may recommend a reservation for a new entity 110 to expose the user 106 to new entities 110 or a reservation for a familiar entity 110 at a new time, day, or date. Or, the recommendation module 128 may recommend a deal for a new good and/or service to expose the user 106 to new goods and/or services offered by an entity 110. Additionally or alternatively, as a non-limiting example, the recommendation module 128 may recommend reservations to encourage a user 106 who does not generally make reservations to make reservations, delivery or pick-up recommendations to users 106 who usually dine-in, etc. The recommendation module 128 may leverage characteristics associated with the entities 110, user data 122, user patterns, etc. in making the recommendations.

In at least one example, the recommendation module 128 may leverage user interactions between a user 106 and other users 106 who are a part of the user's 106 social graphs to personalize recommendations. In a non-limiting example, the pattern determination module 126 may determine that a user 106 interacts with User A, User B, and User C more than any other users 106. In some examples, one or more other users 106 who are in a same social graph as a user 106 (e.g., User A, User B, and/or User C) may have relationships and/or exhibit similar behaviors (e.g., visit the same restaurants, same or similar dining preferences, etc.) to the user 106. In at least one example, the recommendation module 128 may leverage user data 122 and/or user patterns for a user 106 to generate and send recommendations to other users such as User A, User B, and/or User C. Additionally or alternatively, the pattern determination module 126 may determine that the user 106 and user B have patronized Restaurant A at a frequency above a predetermined threshold and/or a predetermined number of times (possibly during a predetermined time period). The recommendation module 128 may access user data 122 indicating that the User B's birthday is approaching. Accordingly, the recommendation module 128 may recommend a reservation at Restaurant A for User B and the user 106 on or before User B's birthday.

In at least one example, the recommendation module 128 may send recommendations to the presentation module 130 at or before a date that corresponds (e.g., is mapped) to a user pattern. For instance, if a user pattern indicates that a user 106 makes a reservation at Restaurant B each year on January $21^{st}$, the recommendation module 128 may send a recommendation to the presentation module 130 on or at a predetermined time before January $21^{st}$. In such an example, the presentation module 130 may cause a recommendation 134 to be presented to the user 106 via a user device 108 on January $21^{st}$ or a predetermined time before January $21^{st}$.

The presentation module 130 may cause recommendations 134 to be presented to the users 106 on displays 132 of the user devices 108. In at least one example, the presentation module 130 may cause recommendations 134 to be presented to the user 106 via a user interface, email, text message, etc., as described below in FIGS. 5 and 6. The recommendations 134 may include recommendations for reservations, deals, invitations to events, etc. For instance, the presentation module 130 may cause one or more recommendations to be presented to a user 106 in predetermined time intervals, at a predetermined frequency, on or before a date, etc.

In at least one example, the presentation module 130 may cause information to be presented to the entity devices 112. In at least one example, the presentation module 130 may cause the information to be presented to the entities 110 via a user interface, email, text message, etc. For instance, the presentation module 130 may present information about users 106 to the entities 110. In a non-limiting example, the presentation module 130 may provide a notification that it is a user's 106 birthday, specific directions from the user 106, requests for a prime table (e.g., a table with a view, etc.), dessert, or some other special treatment, etc. The entities 110 may access the information via the entity devices 112 and may perform an action that is consistent with the information. In a non-limiting example, the entity 110 may leverage the information to present a birthday dessert for a birthday celebration, to decant a special bottle of wine before users 106 arrive at the entity 110 for their reservation, place an order for a user 106, etc.

Figure 2:
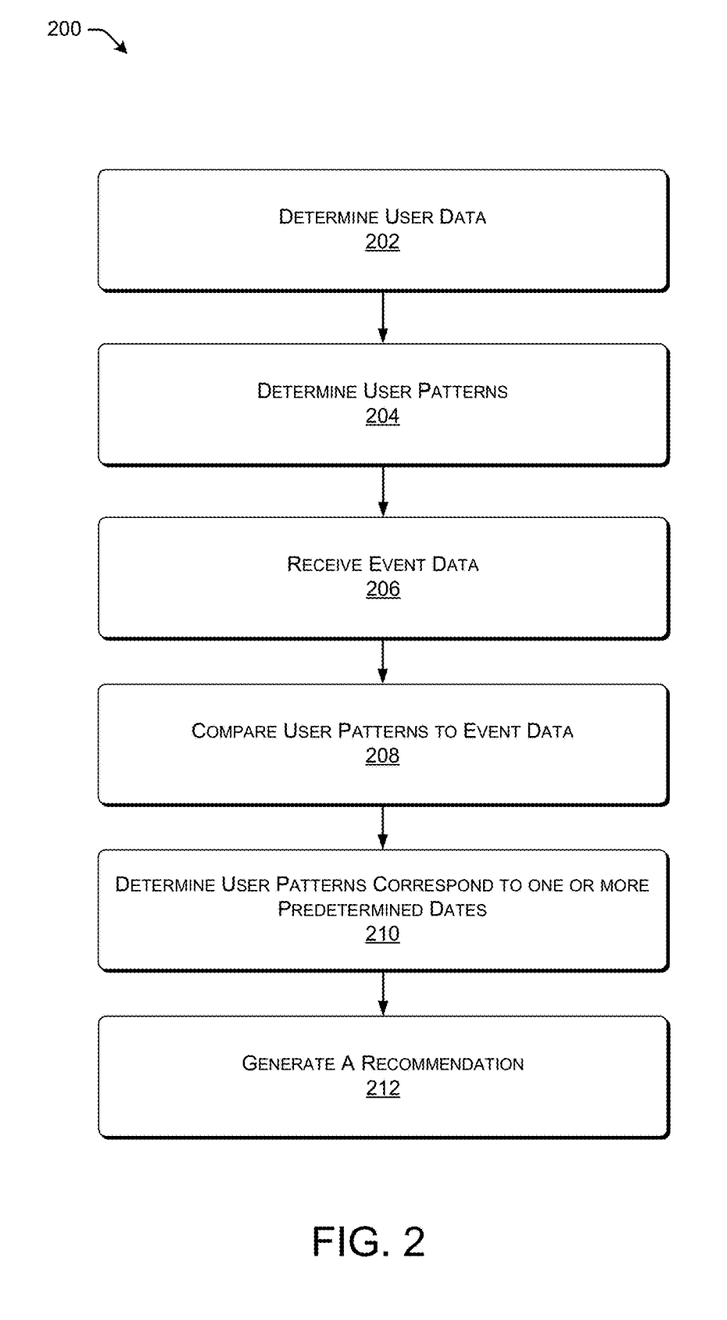
FIG. 2 is a flow diagram showing an illustrative process to present recommendations to users based on learning user patterns.
Figure 3:
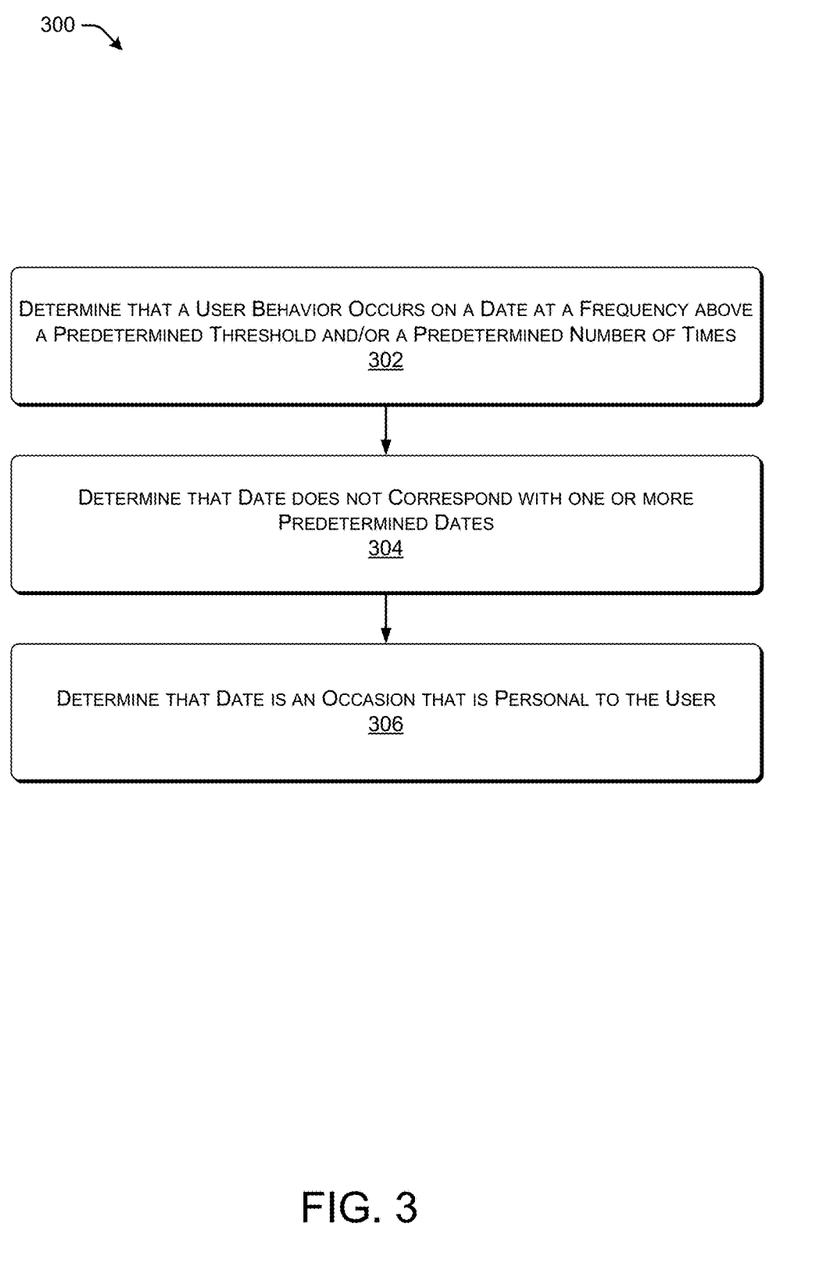
FIG. 3 is a flow diagram showing an illustrative process to determine dates that are occasions that are personal to users based on learning user patterns.
Figure 4:
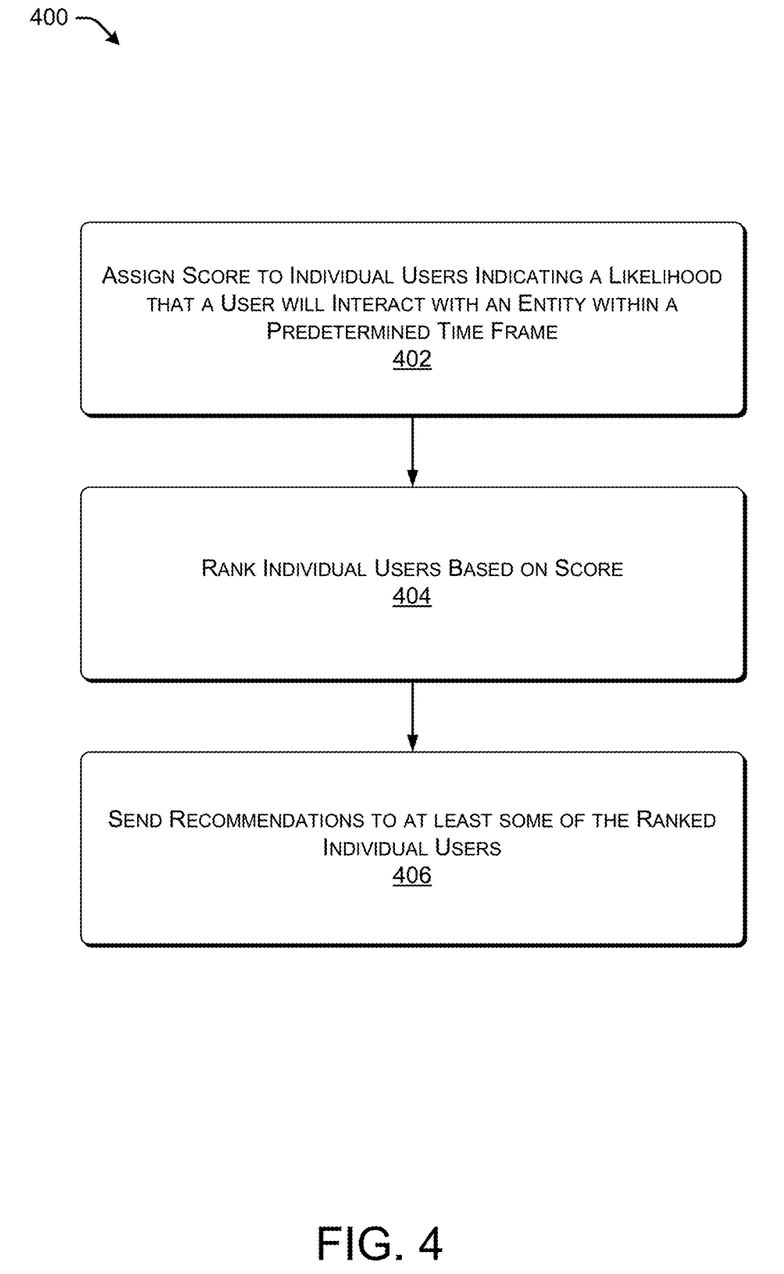
FIG. 4 is a flow diagram showing an illustrative process to send recommendations to users based on scores that are assigned to the individual users.

FIGS. 2-4 describe example processes for identifying user patterns and leveraging the user patterns to personalize recommendations associated with various entities 110 to users 106. For instance, processes 200, 300, and 400 may be used to personalize recommendations associated with restaurants, spas, retail stores, fitness facilities, etc. The example processes are described in the context of the environment of FIG. 1 but are not limited to that environment. The processes are illustrated as logical flow graphs, each operation of which represents a sequence of operations that may be implemented in hardware, software, or a combination thereof. In the context of software, the operations represent computer-executable instructions stored on one or more computer-readable media 118 that, when executed by one or more processors 116, perform the recited operations. Generally, computer-executable instructions include routines, programs, objects, components, data structures, and the like that perform particular functions or implement particular abstract data types.

The computer-readable media 118 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media 118 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

FIG. 2 is a flow diagram showing an illustrative process 200 to present recommendations to users 106 based on learning user patterns. The operations described with respect to FIG. 2 may be performed by the service provider 102 (e.g., the content servers 114) and/or an entity device 112, as described above and illustrated in FIG. 1.

Block 202 illustrates determining user data 122. The data collection module 120 may receive, access, and/or infer user data 122 from user devices 108, based on the service provider 102 receiving user information and actions associated with a user account, and/or from third party sources and systems, as described above. In at least one example, the data collection module 120 may receive, access, and/or infer user data 122 based at least in part on a user 106 redeeming previously acquired deals associated with the entities 110, the user making reservations at the entities 110, or processing payment, via the user device, at the entities 110, etc., as described above.

The user data 122 may include data associated with behavior exhibited by a user 106, as described above. Generally, the user data 112 may include data associated with entities 110 that users 106 patronize, dates and/or times that the users 106 patronize the entities 110, behavior data relating to goods and/or services requested and/or received from the entities 110, information regarding other users 106 who patronize the entities 110 with the users 106, etc., as described above. In at least one example, the user data 122 may include a listing of restaurants that a user 106 patronizes (e.g., dine-in, take-out, delivery, etc.), dates and/or times that the user 106 patronizes at restaurants, the identity of food and/or beverage items ordered at restaurants, information relating to other users 106 that the user 106 dines with, etc. Similarly, the user data 122 may include data relating to spas that a user 106 patronizes, a listing of spa services ordered at the spas, dates and/or times that the user 106 patronizes the spa, information relating to other users 106 who patronize the spa with the user 106, etc. In at least one example, the user data 122 may be associated with the user 106 and one or more other users 106 in the user's 106 social network (e.g., associated with a same social graph as the user 106). The one or more other users 106 may represent users 106 who have a special relationship to the user 106, such as the user's 106 family or friends.

Block 204 illustrates determining user patterns. The pattern determination module 126 may learn user patterns based on the user data 122 via one or more machine learning algorithms, described above. As described above, the user patterns may represent user behaviors that have previously occurred at a frequency above a predetermined threshold and/or that have occurred a predetermined number of times (possibly during a predetermined time period), and as a result, are likely to represent a propensity of a user 106 to interact with entities 110 in a same manner in the future. In some examples, the pattern determination module 126 may determine user patterns with respect to which entities 110 users 106 patronize, whether the users 106 patronize a variety of entities 110, frequencies that users 106 patronize the entities 110, a number of times users 106 have visited entities 110 or other entities 110 determined to be similar to the entities 110, goods and/or services requested and/or received from entities 110, etc., as described above.

In an example, the pattern determination module 126 may learn that an individual user 106 patronized an entity 110 on a past date at a frequency above a predetermined threshold and/or a predetermined number of times (possibly during a predetermined time period). Accordingly, the pattern determination module 126 may determine that the individual user 106 is likely to patronize the entity 110 on the same date in the future. In an alternative and/or additional example, the pattern determination module 126 may learn that an individual user 106 requested a good and/or a service on a past date at a frequency above a predetermined threshold and/or a predetermined number of times (possibly during a predetermined time period). Accordingly, the pattern determination module 126 may determine that the individual user 106 is likely to request a same good and/or service on the same date in the future. In yet another alternative and/or additional example, the pattern determination module 126 may learn that an individual user 106 interacted with an entity 110 in an atypical manner on a past date at a frequency above a predetermined threshold and/or a predetermined number of times (possibly during a predetermined time period).

Accordingly, the pattern determination module 126 may determine that the individual user 106 is likely to interact with an entity 110 in the atypical manner on the same date in the future.

Block 206 illustrates receiving event data 124. The data collection module 120 may receive, access, and/or infer (i.e., determine) event data 124 from various sources. For example, the event data 124 may be determined from the user data 122, manually input by the service provider 102, users 106, and/or entities 110, accessed via websites, and/or provided by other third party sources and systems, etc. As described above, event data 124 may include one or more predetermined dates for holidays such as national holidays, regional holidays, cultural holidays, and/or religious holidays, events such as theater performances, sporting events, festivals, concerts, etc. In some examples, the data collection module 120 may receive, access, and/or infer (i.e., determine) event data 124 that includes dates that correspond to occasions that are personal to the users 106 such as birthdays, anniversaries, and/or other occasions associated with the users 106 and/or friends and/or family of the users 106.

Block 208 illustrates comparing user patterns to event data 124. The pattern determination module 126 may compare the user patterns to the event data 124 to determine whether individual user patterns correspond to the one or more predetermined dates associated with the event data 124. In at least one example, the pattern determination module 126 may compare the dates associated with user patterns to the one or more predetermined dates associated with the at least one of the events (e.g., national holidays, regional holidays, cultural holidays, religious holidays, theater performances, sporting events, festivals, concerts, etc.). In some examples, the pattern determination module 126 may compare user patterns to event data 124 to determine whether an individual user 106 is likely to request the one or more goods and/or services and/or patronize an entity 110 on a date.

Block 210 illustrates determining that user patterns correspond to one or more of the predetermined dates. The pattern determination module 126 may access user data 122 and/or user patterns and event data 124 and may compare the user data 122 and/or user patterns to the event data 124 to determine whether any of the user patterns correspond to the one or more particular dates associated with the event data 124. In some examples, a user pattern may correspond with a date of the one or more particular dates. Accordingly, the pattern determination module 126 may map the user pattern that corresponds to the date to the respective event and/or event date. That is, the pattern determination module 126 may store the determined user patterns, events, and/or dates in a database associated with the data collection module 120 and the user patterns, events, and/or event dates may be associated with one another using identifiers, tags, labels, etc. As a result, when the respective event date approaches (e.g., within one week, one month, etc.), the recommendation module 128 may personalize recommendations based on the user patterns that are mapped to the respective events and/or event dates.

Block 212 illustrates generating a recommendation. The recommendation module 128 may generate recommendations for users 106 based on determining that the user patterns correspond to the respective dates. The recommendation module 128 may send the recommendations to the presentation module 130. The presentation module 130 may generate personalized user interfaces that provide functionality to present recommendations to users 106. The presentation module 130 may cause the user interfaces to be presented to the user 106 via a display 132 of the user device 108. The recommendations may include reservations at entities 110 on dates that correspond with the one or more predetermined dates and/or dates determined to be occasions that are personal to the users 106, deals offered by the entities 110, invitations to events hosted and/or sponsored by the entities 110, etc. The presentation module 130 may cause the recommendations to be presented to the users 106 on or before the dates that correspond with the user patterns, as described above. In at least one example, the recommendations may include recommendations consistent with atypical interactions, as described above. In a non-limiting example, a user 106 may order champagne on a date when the user 106 does not regularly order champagne, as described above. The recommendation module 128 may generate a recommendation associated with champagne that may be presented to the user 106 on or before the date. Process 200 is an example of learning user patterns and leveraging the user patterns to personalize the frequency and content of recommendations to users 106.

FIG. 3 is a flow diagram showing an illustrative process 300 to determine dates that correspond to occasions that are personal to users 106 based on learning user patterns. The operations described with respect to FIG. 3 may be performed by the service provider 102 (e.g., the content servers 114) and/or an entity device 112, as described above and as illustrated in FIG. 1.

Block 302 illustrates determining that a user behavior occurs on a date at a frequency above a predetermined threshold and/or a predetermined number of times (possibly during a predetermined time period). The pattern determination module 126 may leverage the user data 122 to determine that the user 106 interacts with an entity 110 in a particular manner on the date at the frequency above the predetermined threshold and/or a predetermined number of times. That is, the pattern determination module 126 may determine a user pattern associated with the date. For instance, in a non-limiting example, the pattern determination module 126 may determine that a user 106 patronizes a restaurant on a date at a frequency above the predetermined threshold and/or a predetermined number of times (possibly during a predetermined time period). In some examples, the user behavior may be an atypical interaction, as described above.

Block 304 illustrates determining that the date does not correspond with one or more predetermined dates. The pattern determination module 126 may compare the date with the one or more predetermined dates associated with the event data 124. The pattern determination module 126 may determine that the date does not correspond with any of the one or more predetermined dates corresponding to the holidays, events, etc.

Block 306 illustrates determining that the date is an occasion that is personal to the user 106. Responsive to the pattern determination module 126 identifying a user pattern associated with the date and the date not corresponding to any dates associated with the event data 124, the pattern determination module 126 may determine that the date is an occasion that is personal to the user 106. The pattern determination module 126 may map the user pattern to the date based on an inference that the date is an occasion that is personal to the user 106. For the purpose of this discussion, a date may be an occasion that is personal to a user 106 if the date is not associated with a holiday (e.g., regional, national, religious, cultural, etc.) and/or event (e.g., performances, sporting events, festivals, concerts, etc.) but is related to and/or directed to an occasion that is noteworthy, remarkable, important, etc. to the user 106. For instance, a date that corresponds to an occasion that is personal to the user 106 may be a date of a birthday, anniversary, other occasion, etc., of the user 106, the user's friends, and/or the user's family members. Accordingly, when the date is approaching (e.g., within one week, one month, etc.), the recommendation module 128 may make recommendations to the user 106 based on the user pattern that is mapped to the date.

In at least one example, the presentation module 130 may cause a prompt to be sent to the user 106 using various communication channels (e.g., a website, an e-mail message, a text message, etc.) and presented to the user 106 via a user interface. The prompt may request additional information about the date and/or occasion from the user 106. As a non-limiting example, the prompt may present the text "Is today a special occasion?" and may provide various options for the user 106 to indicate that the date is an occasion that is personal to the user 106 and the occasion. For instance, the user 106 might indicate that the date is his or her birthday, what birthday it is, relevant details about the birthday, etc. Receiving a response from a user 106 may validate the implied occasion. In some examples, the pattern determination module 126 may receive information from the entity devices 110 validating implied occasions. For example, a user 106 may tell a hostess that it is her birthday and the hostess may input such information into the entity device 110. In at least one example, based at least in part on receiving user data 118 from the user 106 in response to the prompt, the service provider 102 may provide the information to the entity 110 via an entity device 112. The entities 110 may access the information via the entity devices 112 and may perform an action that is consistent with the information, as described above.

FIG. 4 is a flow diagram showing an illustrative process 400 to send recommendations to users 106 based on scores that are assigned to the users 106. The operations described with respect to FIG. 4 may be performed by the service provider 102 (e.g., the content servers 114) and/or an entity device 112, as described above and as illustrated in FIG. 1.

Block 402 illustrates assigning a score to individual users 106 indicating a likelihood that each user 106 will interact with an entity 110 within a predetermined time frame. The predetermined time frame may be an hour, day, week, month, etc. The recommendation module 128 may access the users 106 in the database associated with the user data 122 and may assign each of the users 106 a score associated with a predetermined time frame. The score may represent a likelihood that a user 106 will interact with an entity 110 during the hour, the day, the week, the month, etc. The recommendation module 128 may assign the score based on user patterns that are mapped to dates in the predetermined time frame. In a non-limiting example, at the beginning of each week, the recommendation module 128 may assign scores to each of the individual users 106 based on user patterns mapped to the dates of the week. For example, if the pattern determination module 126 determines a user pattern indicating that a user patronizes a restaurant on a same date each year and that date is within the week of interest, the recommendation module 128 may assign a score close to 1, indicating that the user 106 is likely to patronize a restaurant on the date. On the other hand, if a user 106 does not have any user patterns mapped to a date within the week of interest, the recommendation module 128 may assign a score close to 0, indicating that the user 106 is not likely to patronize a restaurant on the date. Various other scoring mechanisms may be used.

The recommendation module 128 may utilize other user data 122 to assign the scores. In at least one example, the recommendation module 128 may utilize data accessed and/or received from third party sources and systems, geographical data, and/or data from social graphs to assign scores. As a non-limiting example, the recommendation module 128 may determine that one or more of a user's 106 friends are travelling to see the user 106 via social media posts, etc. Based at least in part on determining that the user 106 is going to have friends in town, the recommendation module 128 may increase the score associated with the user 106.

In an alternative or additional non-limiting example, a user pattern may indicate that a user 106 is likely to dine out on a date. However, each time the recommendation module 128 has sent a recommendation via the presentation module 130 to the user 106, the user 130 has not interacted with the recommendation (e.g., not made a reservation, not acquired a deal, etc.). Accordingly, the recommendation module 128 may decrease the score associated with the user 106.

Block 404 illustrates ranking the individual users 106 based on the scores. The recommendation module 128 may rank the users 106 based on their scores. Highest ranking users 106 (e.g., users 106 with a highest score) may be most likely to interact with an entity 110 within the predetermined time frame and lowest ranking users 106 (e.g., users 106 with a lowest score) may be least likely to interact with an entity 110 within the predetermined time frame.

Block 406 illustrates sending recommendations to at least some of the ranked individual users 106. The recommendation module 128 may send recommendations to the users 106 via the presentation module 130 and user devices 108. In some examples, the recommendation module 128 may send recommendations to users 106 with scores above a predetermined threshold. In other examples, the recommendation module 128 may send recommendations to a predetermined number of top ranked users 106. The recommendations may be sent to the user 106 using various communication channels (e.g., a website, an e-mail message, a text message, etc.) and presented to the user 106 via a user interface. The content of the recommendations may be based on user patterns that are specific to the users 106. In a non-limiting example, if a first user 106 regularly dines out on Friday nights at Restaurant A and a second user 106 regularly dines out on Friday nights at Restaurant B, both users 106 are equally as likely to dine out on Friday night (e.g., they may have the same scores and ranking), but the recommendation to the first user 106 may be a reservation for Restaurant A and the recommendation to the second user 106 may be a reservation for Restaurant B.

Figure 5:
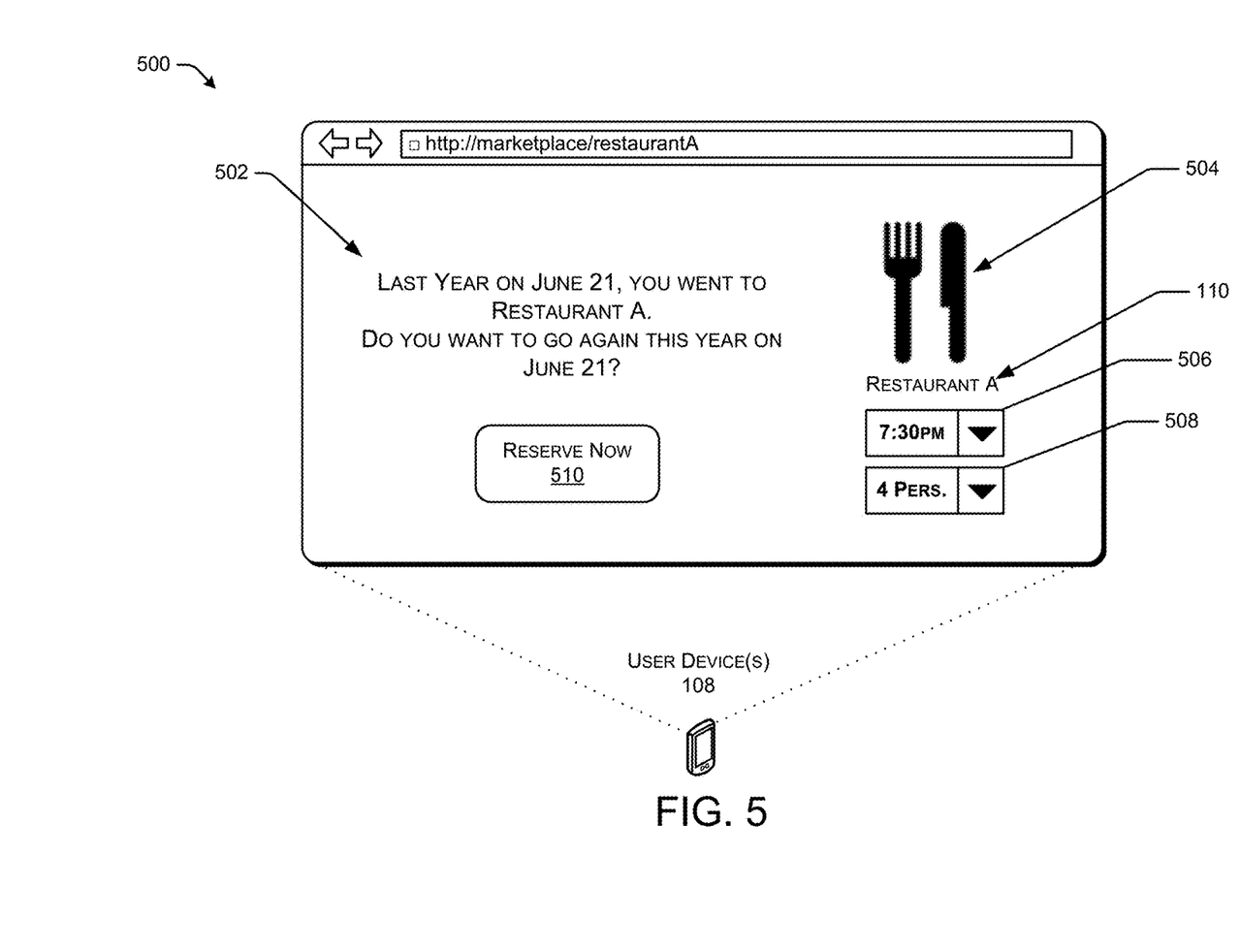
FIG. 5 is a diagram showing an example user interface that may be presented to a user with a recommendation that is based on user patterns.

FIG. 5 is a diagram showing an example user interface 500 that may be presented to a user 106 with a recommendation that is based on user patterns. The presentation module 130 may cause a user interface 500 to be presented to users 106 utilizing any communication channel, such as an e-mail message, a site (e.g., website) associated with the service provider 102, a text message, a social network site, an application that is associated with the service provider 102 and that resides on user device(s) 108 of the users 106, etc. The presentation module 130 may cause the recommendations to be presented to the user 106 on or before a date that is associated with a user pattern, at regular frequencies, etc. The user interface 500 may include personalized content 502 that is based on user patterns. As a non-limiting example, the pattern determination module 126 may have determined that the user 106 has dined at Restaurant A on June 21 at a frequency above a predetermined threshold during a predetermined period of time such that the user is likely to dine at Restaurant A again on June 21. Accordingly, the user interface 500 may include personalized content recommending a reservation at Restaurant A on June 21. The presentation module 130 may cause the user interface 500 to be presented to the user 106 a predetermined time period before June 21.

In FIG. 5, the entity 110 is a restaurant, Restaurant A. The user interface 500 may include information that describes the entity 110 (e.g., Restaurant A) and one or more images, photos, etc., 504 that represent the entity 110 (e.g., Restaurant A). In some examples, a user 106 may indicate that he or she is interested in making a reservation by actuating a control 510 on the user interface. In at least one example, the user 106 may specify multiple variables (e.g., date, time, party size, table features, etc.) from drop down menus (e.g., time drop down menu 506, and party size drop down 508, etc.) prior to actuating the control 510 to request the reservation. In some examples, variables may be pre-selected via user profiles, etc. In additional or alternative examples, the service provider 102 may recommend times, party size, etc. for the user 106 based on user data 122. In such examples, the service provider 102 may auto-populate the drop down menus. Drop down menus are shown for illustrative purposes only and any type of representation may be used to indicate or display the multiple variables. In other examples, the presentation module 130 may prompt the user 106 for additional information responsive to the user 106 actuating the control 510 to request a reservation. For instance, the presentation module 130 may prompt the user 106 for a time associated with the reservation request, a number of users 106 in the user's 106 party, payment information, special requests, etc.

In at least one example, the presentation module 130 may cause a reservation confirmation to be presented to the user 106 via a user interface, email, text message, etc. The reservation confirmation may include the date, time, and any other user 106 requests. The reservation confirmation may also include additional information such as driving directions, parking information, public transportation options, etc. Additionally or alternatively, the reservation confirmation may include service or food/beverage menus, specials, suggested activities, events, etc. occurring prior to and/or after the reservation time, etc.

Figure 6:
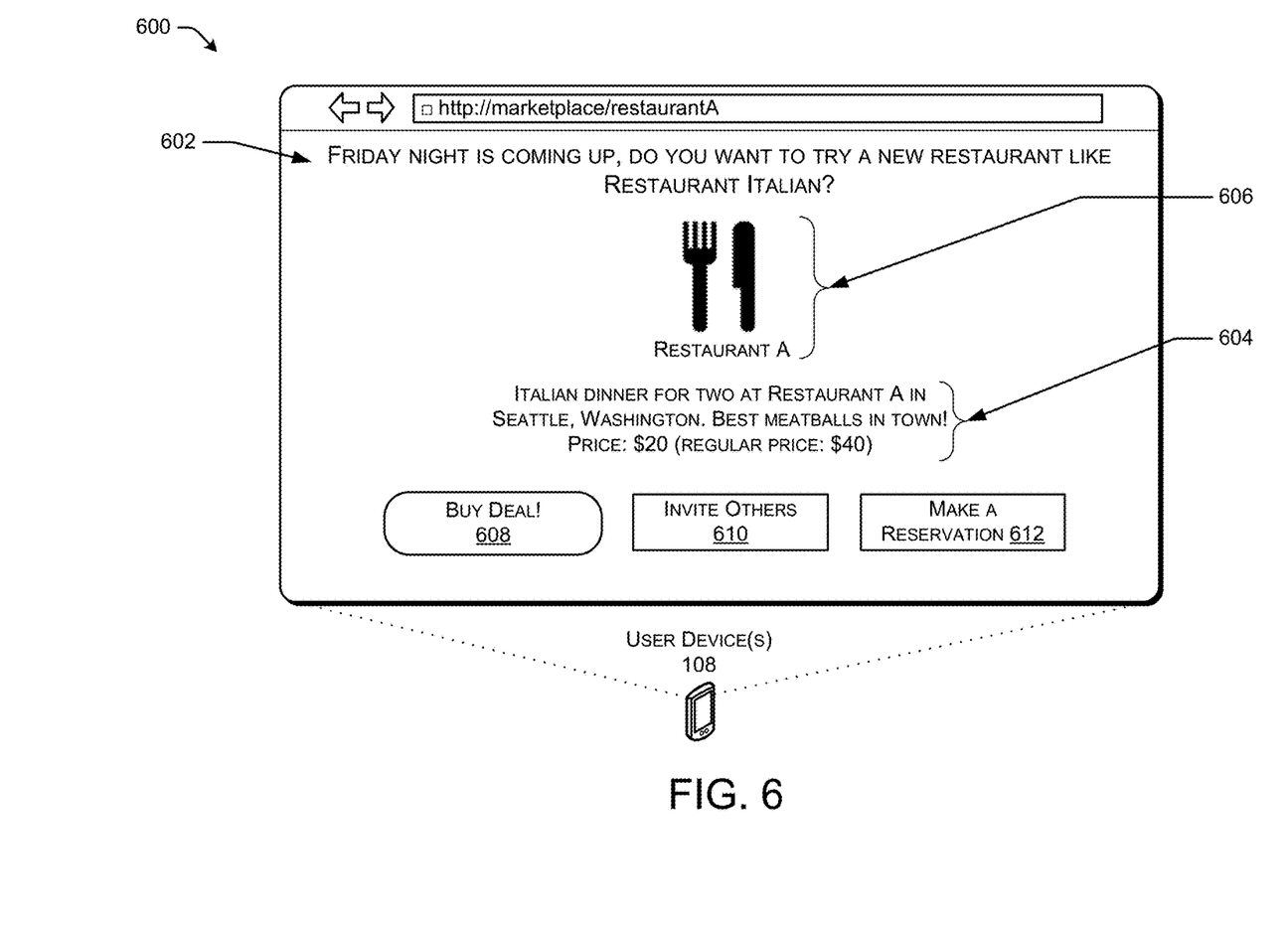
FIG. 6 is a diagram showing another example user interface that may be presented to a user with a recommendation that is based on user patterns.

FIG. 6 is a diagram showing an example user interface 600 that may be presented to a user 106 with a recommendation that is based on user patterns.

As described above, the presentation module 130 may cause a user interface 600 to be presented to users 106 utilizing any communication channel, such as an e-mail message, a site (e.g., website) associated with the service provider 102, a text message, a social network site, an application that is associated with the service provider 102 and that resides on user device(s) 108 of the users 106, etc. The presentation module 130 may cause the recommendations to be presented to the user 106 on or before a date that is associated with a user pattern. The user interface 600 may include personalized content 602 that is based on user patterns. As a non-limiting example, the pattern determination module 126 may determine that the user 106 dines out on Friday nights at a frequency above a predetermined threshold and/or a predetermined number of times such that the user is likely to dine out again on an upcoming Friday night. The pattern determination module 126 may determine that the user 106 dines at Restaurant Italian at the frequency above a predetermined threshold and/or the predetermined number of times. The recommendation module 128 may determine that Restaurant A is similar to Restaurant Italian based on comparing the types of food served by both restaurants, reviews about each restaurant, locations of each restaurant, etc. Accordingly, the user interface 600 may include personalized content 602 promoting a deal at Restaurant A. The presentation module 130 may cause the user interface 600 to be presented to the user 106 on Friday or at a predetermined time period before Friday.

As shown, the user interface 600 may include deal information 604 that describes the deal and an image, photo, etc., 606 that represents the items associated with the deal (i.e., a fork and knife for a restaurant). For instance, the deal information 604 may include the item(s) (e.g., products, services, etc.) being offered in the deal. For instance, for the purposes of FIG. 6, the item featured in the deal is an Italian dinner. The deal information 604 also includes descriptive information that explains what the Italian dinner entails. Here, the deal information 604 specifies the location in which the deal is to be redeemed (e.g., Seattle, Wash.), the entity 110 associated with the deal (Restaurant A), and other information. The user interface 600 also includes information relating to the price of the deal (e.g., $20).

A user 106 may acquire the deal by actuating a "Buy Deal!" button 608. Before, during, or after the user 106 acquires the deal, the user 106 may provide additional information relevant to the acquisition of the deal, such as how many deals the user 106 would like to acquire, relevant payment information, personal preferences, a number of users 106 in his or her group, etc. At 610, before, during, or after the user 106 acquires the deal, the user 106 may also invite other users 106, who may be in a same group as the user 106, to acquire the deal and to redeem the deal with the user 106. The user 106 may input contact information (e.g., e-mail addresses, telephone numbers, unique identifiers, etc.) for the other users 106, which may cause the service provider 102 to send a notification to those other users 106. The other users 106 may then have the opportunity to acquire the same deal as the user 106. In some examples, before, during, or after the user 106 acquires the deal, the user 106 may request to view related deals. Related deals may include deals relating to transportation services for transporting the user 106 (and his or her group) to the entity 110 offering the presented deal, other deals associated with the same entity 110, other deals offered by entities 110 offering similar services to the deal, etc. At 612, the user 106 may elect to make a reservation with the entity offering the deal. Moreover, the user interface 600 is one example of a user interface 600 that facilitates the acquisition of deals and any other presentation or configuration may be used.

The user interfaces 500 and 600 are examples of user interfaces that include personalized content that are presented to users 106. In FIGS. 5 and 6, a restaurant entity 110 is shown for illustrative purposes. However, any other presentation or configuration may be used for any type of entity 110 as described above.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   one or more processors;
   memory; and one or more computer-executable instructions stored in the memory and executable by the one or more processors to perform operations comprising:
  determining user data associated with restaurant behavior exhibited by a user, the restaurant behavior identifying restaurants that the user patronized and dates that the user patronized individual ones of the restaurants;
  determining, based on the user data, a user pattern associated with the user and a restaurant of the restaurants, the user pattern being determined based on at least one of a frequency in which the user patronized the restaurant during a period of time or a number of times the user patronized the restaurant during the period of time;
  receiving, from a device, event data including one or more predetermined dates;
  comparing the user pattern to the event data;
  based at least in part on comparing the user pattern to the event data, determining that the user pattern corresponds to a predetermined date of the one or more predetermined dates;
  generating an electronic tag indicating that the user pattern corresponds to the predetermined date;
  determining, based at least partly on the user pattern corresponding to the predetermined date, a score for the predetermined date with respect to the user, the score indicating a likelihood of interaction by the user with the restaurant on the predetermined date;
  generating, based at least partly on the score being above a threshold score, a recommendation for a reservation at the restaurant on the predetermined date; and
  generating a user interface that includes the recommendation, a button that is selectable to request the reservation at the restaurant, and one or more drop-down menus to specify at least one of a time or a number of individuals for the reservation.

2. The system of claim 1, wherein the one or more predetermined dates include one or more of national holidays, regional holidays, religious holidays, or cultural holidays.

3. The system of claim 1, wherein the operations further comprise:
  determining, based at least partly on the user data, an additional user pattern associated with the user and an additional restaurant;
  determining that the additional user pattern is associated with a date;
  based at least in part on comparing the additional user pattern to the event data, determining that the date is not included in the one or more predetermined dates; and
  determining that the date is at least one of a birthday, an anniversary, or an occasion associated with the user.

4. The system of claim 1, wherein the operations further comprise sending, based at least partly on the electronic tag and on a current date being within a threshold period of time with respect to the predetermined date, the user interface to a user device associated with the user.

5. The system of claim 1, wherein the operations further comprise:
  generating an additional user interface that provides functionality for acquiring a deal for the restaurant on a date that is different than the predetermined date; and
  sending the additional user interface to a user device associated with the user on or before the date.

6. A method comprising:
  determining user data associated with user behavior exhibited by a user, the user behavior being associated with one or more entities that each offer one or more goods or one or more services;
  determining a user pattern from the user data, the user pattern being based at least partly on a frequency in which the user exhibited the user behavior or a number of times that the user exhibited the user behavior;
  determining that one or more dates associated with the user behavior correspond to one or more predetermined dates associated with event data;
  determining, based at least partly on the user pattern corresponding to the one or more predetermined dates, a score with respect to the user for a predetermined date of the one or more predetermined dates, the score indicating a likelihood of interaction by the user with an entity of the one or more entities on the predetermined date;
  generating, based at least partly on the score being above a threshold score, a recommendation for a reservation at the entity on the predetermined date; and
  causing the recommendation to be presented via a user interface associated with a user device of the user, the user interface further including one or more controls to request the reservation and specify one or more variables corresponding to the reservation.

7. The method of claim 6, further comprising determining that the user data includes at least one of lists of the one or more entities from which the user requested the one or more goods or the one or more services, data associated with dates that the user requested the one or more goods or the one or more services, data associated with individual goods of the one or more goods or individual services of the one or more services requested by the user, or lists of other users who requested the one or more goods or the one or more services with the user.

8. The method of claim 6, wherein the user pattern is associated with the user and one or more other users who are associated with a same social graph as the user.

9. The method of claim 6, further comprising:
  determining an additional user pattern based at least in part on determining user requests for at least one good of the one or more goods or at least one service of the one or more services from the entity on a date at an additional frequency above a predetermined threshold during a predetermined period of time or above a predetermined number of times during the predetermined period of time;
  determining that the date is not included in the one or more predetermined dates; and
  determining that the date is a birthday, an anniversary, or an occasion associated with the user.

10. The method of claim 9, further comprising causing a prompt to be presented via an additional user interface, the prompt requesting additional information about the birthday, the anniversary, or the occasion from the user.

11. The method of claim 10, further comprising:
  receiving the additional information from the user device; and
  sending the additional information to the entity to enable the entity to perform an action associated with the additional information.

12. The method of claim 6, further comprising:
  determining that requests for at least one good of the one or more goods or at least one service of the one or more services from the entity on a date occurred at least at an additional frequency above a predetermined threshold during a predetermined period of time or above a predetermined number of times during the predetermined period of time; and determining that the date corresponds to the predetermined date.

13. The method of claim 6, further comprising:
determining requests associated with a good of the one or more goods or a service of the one or more services on a date occurred at least at an additional frequency above a predetermined threshold during a predetermined period of time or a predetermined number of times during the predetermined period of time, wherein each instance that the user requested the good or the service, the user patronized a different entity of the one or more entities; and recommending a new entity of the one or more entities for the good or the service on the date.

14. The method of claim 6, wherein the one or more entities comprise one or more restaurants.

15. A system comprising:
one or more processors;
memory; and
one or more computer-executable instructions stored in the memory and executable by the one or more processors to perform operations comprising:
accessing user data associated with a user and corresponding to a user device, the user data representing user interactions with a plurality of entities and individual entities of the plurality of entities being associated with one or more services;
determining, from the user data, a user pattern associated with the user;
determining that a date indicated by the user pattern on which the user requested the one or more services corresponds to a predetermined date of one or more predetermined dates;
determining, based at least partly on the date indicated by the user pattern corresponding to the predetermined date, a score for the predetermined date with respect to the user, the score indicating a likelihood of interaction by the user with an entity of the plurality of entities on the date;
generating, based at least partly on the score being above a threshold score, a recommendation including information associated with a reservation at the entity on the date; and
sending a user interface including the recommendation to the user device on or before the date, the user interface further including a control to request the reservation at the entity and one or more user interface elements to specify at least one of a time or a number of individuals for the reservation.

16. The system of claim 15, wherein the operations further comprise determining the user pattern based at least in part on determining that the user interacted with the entity on the date at least at one of a frequency above a predetermined threshold during a predetermined period of time or a predetermined number of times during the predetermined period of time.

17. The system of claim 15, wherein the operations further comprise determining the user pattern based at least in part on determining that requests associated with the service on the date occurred at least at one of a frequency above a predetermined threshold during a predetermined period of time or a predetermined number of times during the predetermined period of time.

18. The system of claim 15, wherein the operations further comprise determining an additional user pattern based at least in part on determining that the user engaged in interactions with an additional entity on an additional date at least at one of a frequency above a predetermined threshold during a predetermined period of time or a predetermined number of times during the predetermined period of time, the additional pattern being inconsistent with previously determined user patterns associated with the user.

19. The system of claim 15, wherein the operations further comprise generating, based at least partly on the user data, an additional recommendation including additional information associated with a deal associated with a service of the one or more services.

20. The system of claim 15, wherein the operations further comprise:
accessing event data including the one or more predetermined dates, the event data based at least in part on one or more of national holidays, regional holidays, cultural holidays, religious holidays, performances, sporting events, festivals, or concerts.

* * * * *